E. H. HELT.
AUTOMATIC SALES APPARATUS.
APPLICATION FILED DEC. 14, 1920.
1,428,589.
Patented Sept. 12, 1922.
5 SHEETS—SHEET 2.
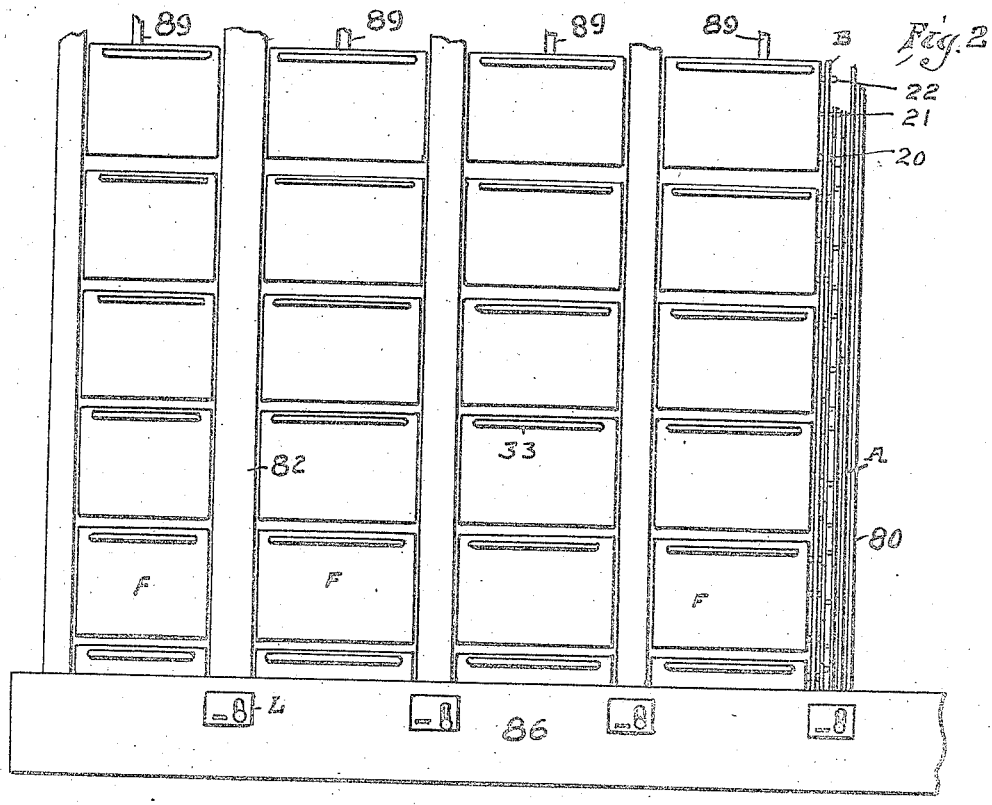
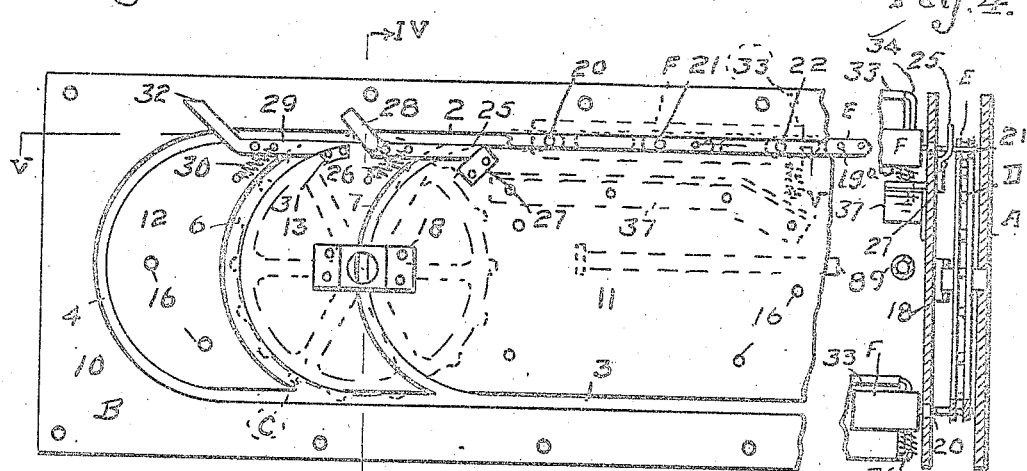
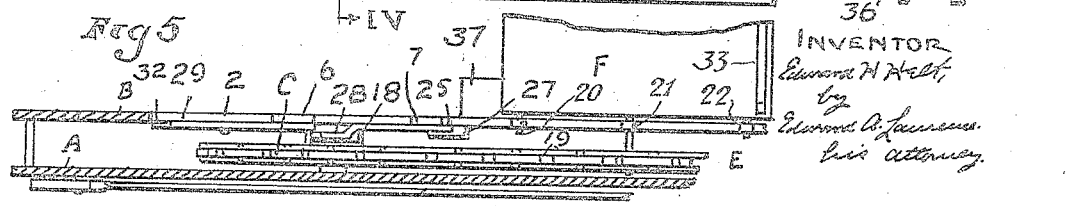

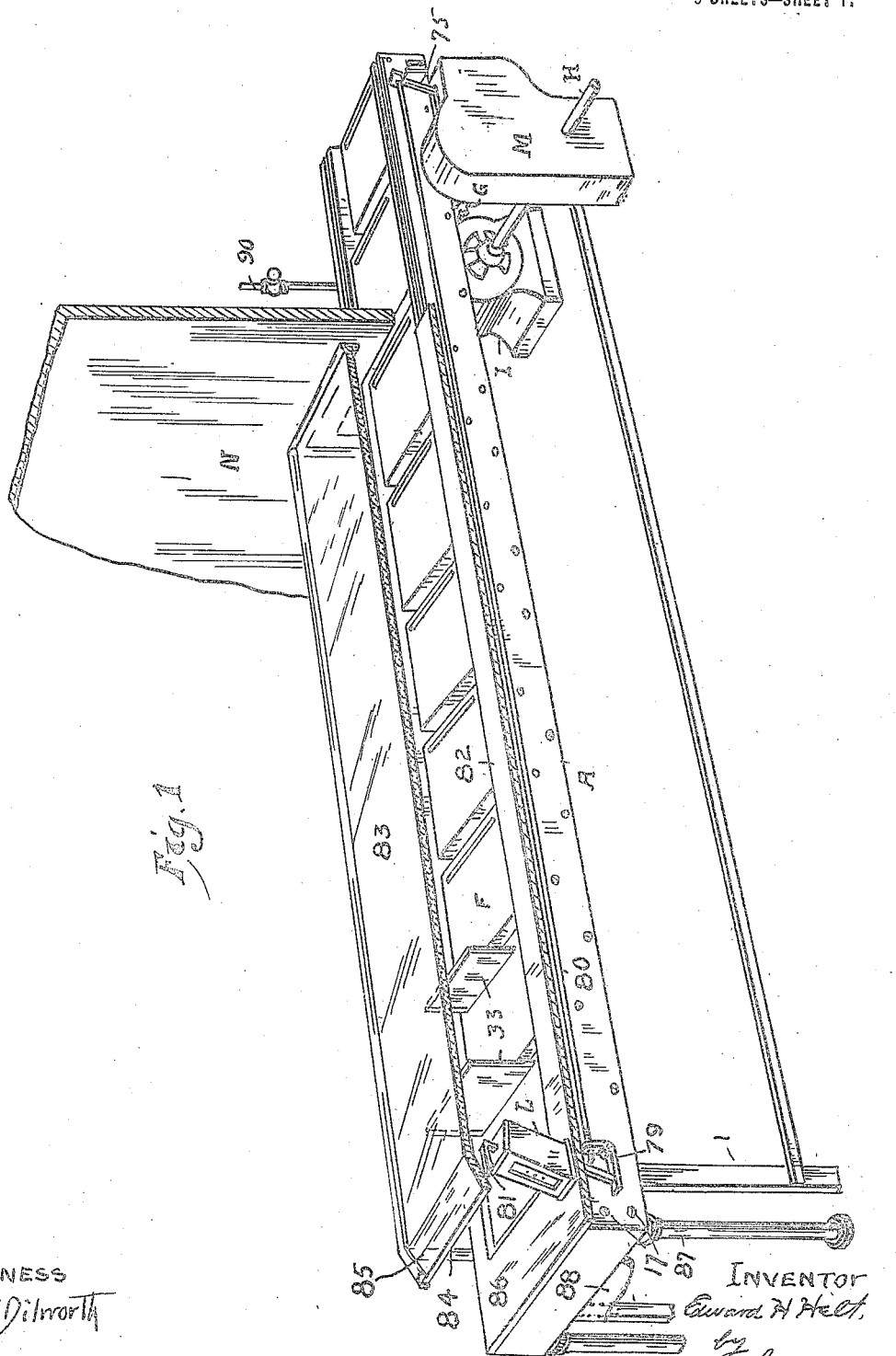

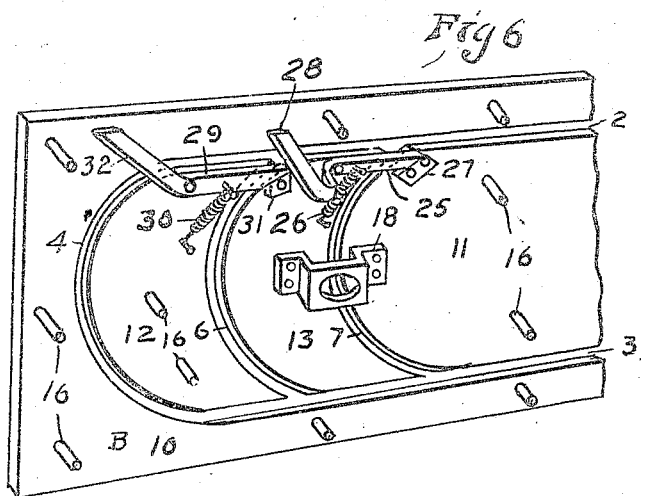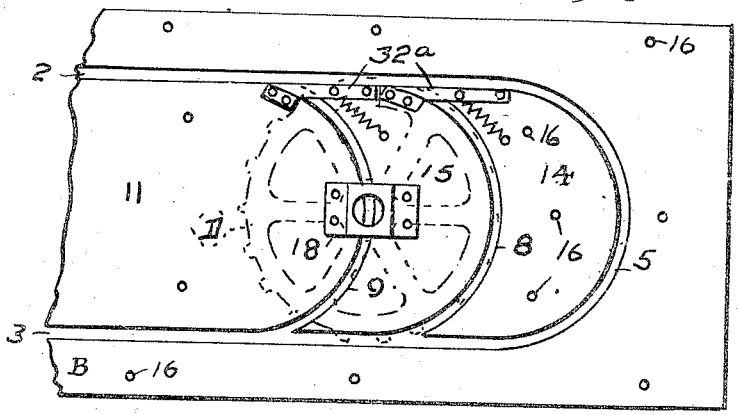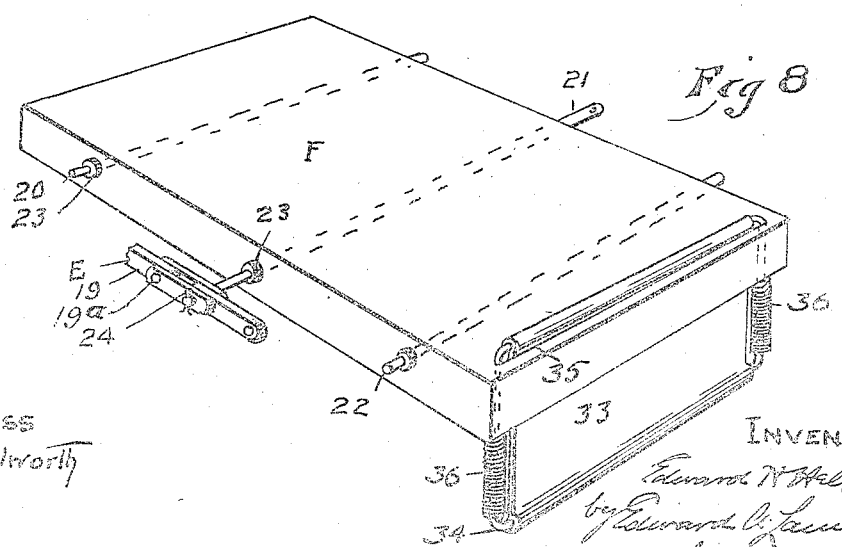

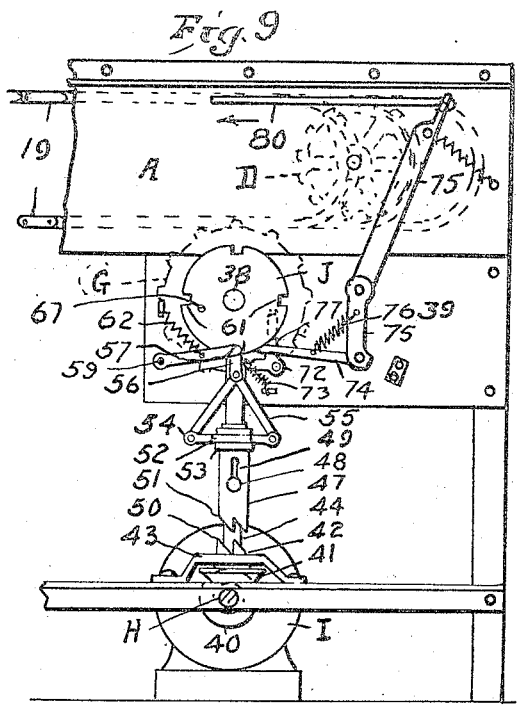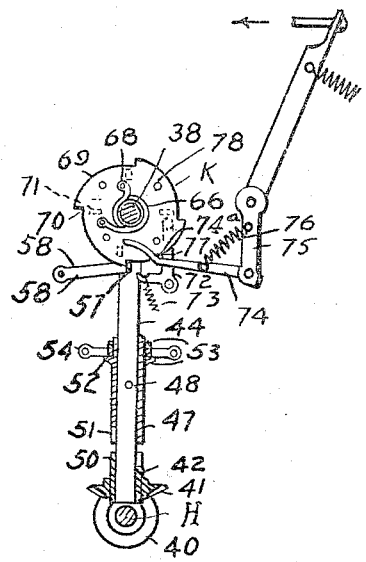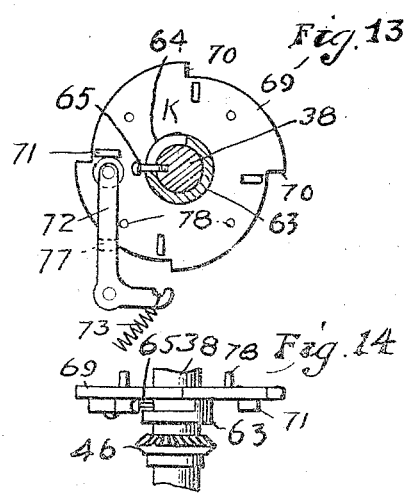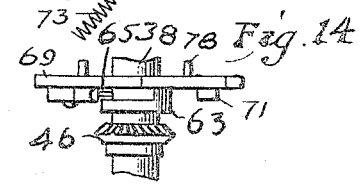

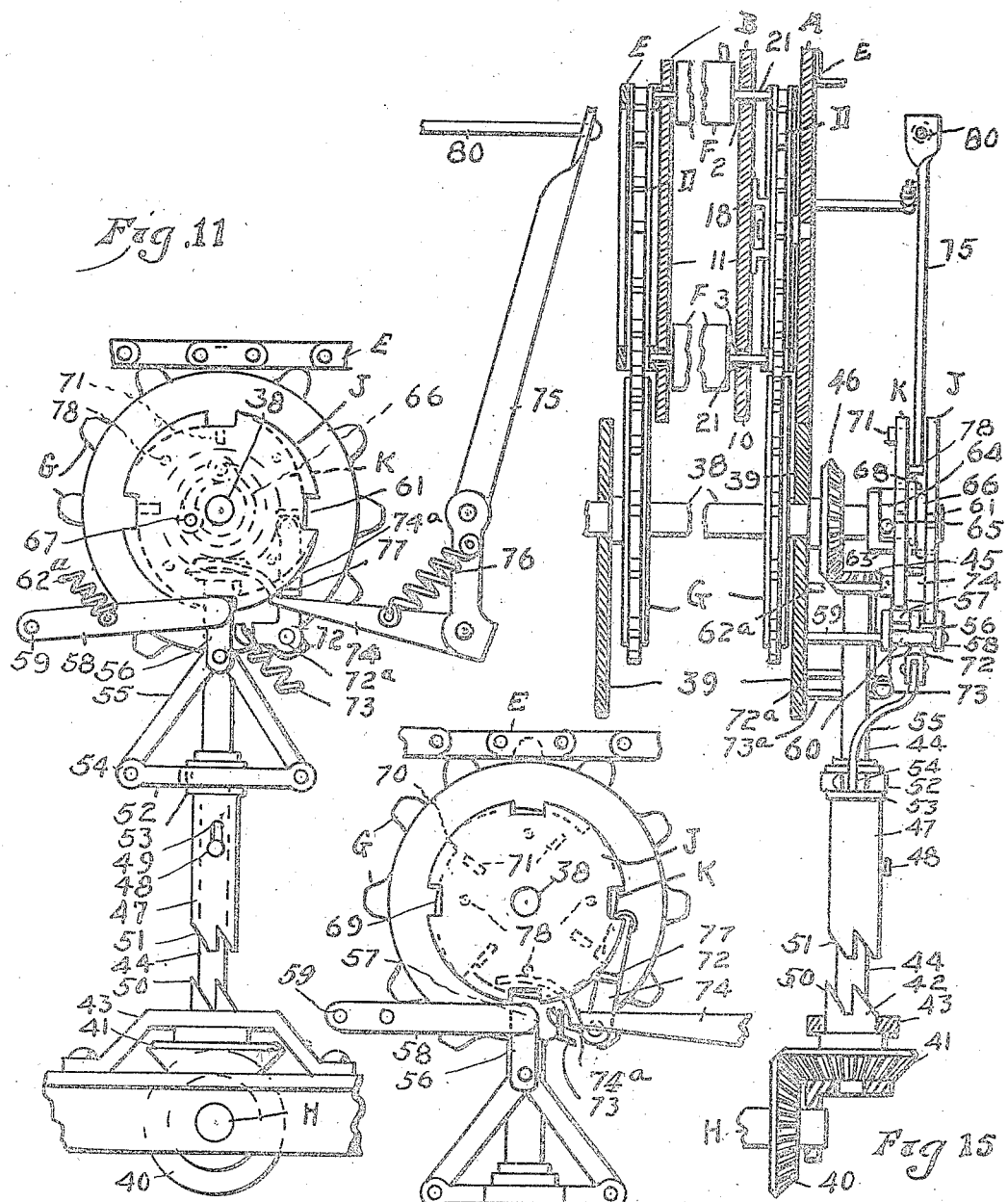

Patented Sept. 12, 1922.

1,428,589

UNITED STATES PATENT OFFICE.

EDWARD H. HELT, OF BELLEVUE BOROUGH, PENNSYLVANIA.

AUTOMATIC SALES APPARATUS.

Application filed December 14, 1920. Serial No. 430,673.

*To all whom it may concern:*

Be it known that I, EDWARD H. HELT, a citizen of the United States, and residing in the borough of Bellevue, in the county of Allegheny and State of Pennsylvania, have invented or discovered new, useful, and Improved Automatic Sales Apparatus, of which the following is a specification.

My invention consists of certain new and useful improvements in automatic sales mechanism.

Although advantageously applicable to the sale of any character of merchandise, the particular purpose for which the same is intended is for restaurant use in connection with coin-operated control devices, so that the patron can satisfactorily serve himself to the viands displayed and which appeal to his taste.

Generally speaking my invention consists of a series of traveling shelves arranged in an endless series, means being provided for presenting said shelves in turn to the take off where the customer has access to the food. Means are provided convenient to the customer whereby the shelves may be set in motion, such means being of any convenient coin-controlled type. Means are provided whereby when the article which the customer has paid for, by dropping the proper coin or coins into the coin-controlled mechanism, has been delivered to him, the traveling shelves become stationary and so remain until a fresh coin or coins are inserted into the mechanism and the same is actuated.

Other novel features of construction and arrangement of parts will appear from the following description.

In the accompanying drawings, which are however merely intended to illustrate a practical embodiment of the principles of my invention without limiting the scope of the latter to the construction shown, Fig. 1 is a perspective showing a store or restaurant unit embodying the principles of my invention; Fig. 2 is a broken plan view showing a plurality of such units assembled together as the same are arranged in an automatic restaurant; Fig. 3 is a broken side elevation showing the front end of one of the side plates of a unit; Fig. 4 is a section taken along the line IV—IV in Fig. 3 but also showing the side beam of the unit; Fig. 5 is a similar view taken along the line V—V in Fig. 3; Fig. 6 is a broken perspective showing the front end of said side plate; Fig. 7 is a broken side elevation of the rear portion of the same; Fig. 8 is a perspective of one of the shelves; Fig. 9 is a broken side view of the rear portion of the unit with the casing removed; Fig. 10 is a similar view with some of the parts removed and others in section; Fig. 11 is an enlarged detail in side elevation showing the locking disk in operative position to hold the shelves stationary; Fig. 12 is a similar but broken view showing the locking bar depressed by the releasing disk out of contact with the locking disk and thus applying rotative power to the driving sprockets; Fig. 13 is a rear view of the releasing disk; Fig. 14 is a plan view of the same; Fig. 15 is a broken vertical cross section of the sales unit showing the side frames, the shelves, the driving chains, the driving sprockets engaging said chains from below, and the means for applying power to said driving sprockets, said means being shown in their inoperative position.

The following is a detailed description of the drawings, the construction of an individual unit being first described.

Each unit is provided with a horizontally disposed frame, supported at a convenient height, as by the vertical legs 1. A represents the longitudinal side beams of the frame, which are conected together in spaced relation in any convenient manner. B represents the inner side plates which are spaced inwardly from the beams A, and are preferably of composite construction, as will be described.

The plates B are each provided with an upper and a lower longitudinal trackway, preferably in the form of horizontal slots 2 and 3, respectively.

The front and rear ends of said slots are connected by outwardly convex, semi-circular slots 4 and 5, respectively, the radius of slots 4 and 5 being equal to one half the vertical distance between the slots 2 and 3, In the rear of slot 4, a pair of slots 6 and 7 of equal radius, similarly connect the slots 2 and 3, the slot 6 intersecting the axis of slot 4, and the slot 7 intersecting the axis of slot 6. Similarly disposed slots 8 and 9 are provided in front of the rear end slot 5.

Thus each of the plates B is separated into or composed of a plurality of sections separated by said slots. The outer rim section 10, the central section 11 and the segmental sections 12 and 14 may be secured in position by connections with the adjacent beams A; as for instance the horizontal studs 16 extending from said sections and abutting against the beam A. Said beam is provided with properly positioned holes, so that screw bolts may be inserted through the beam A and screwed into threaded holes in the ends of the studs 16.

To provide clearance between the segmental sections 13 and 15, respectively, and the beam A, I prefer to support said sections in place by means of exterior bridge pieces 18 attached to the central section 11 and to the sections 13 and 15, respectively, said bridges being channelled or curved to give clearance to an element protruding slightly through the slots 7 and 9.

C and D represent the front and rear sprockets journaled between the beam A and the side plate B with their axes alined with the axes of the curved slots 6 and 8, respectively, and their radius being equal to that of said slots. Any convenient method of journaling said sprockets may be used. Thus they may be mounted on axles whose ends are mounted in holes in the bridges 18 and the beam A.

E represents a pair of endless chains, one of which is mounted upon the front and rear sprockets C and D between each beam A and the adjacent plate B. Said chains are composed of links, such as 19 pivotally connected together by the pins 19ª. Thus it is evident, that the upper and lower flights of the chains will travel parallel with the slots 2 and 3, respectively, while the ends of the chains will parallel the end slots 6 and 8, respectively. The chains E are intended to be intermittently driven, as will be explained.

F represents the traveling shelves or delivery pans which are mounted close together in continuous series on the chains E and which travel between the plates B.

In the drawings I show the shelves F as provided with a flat top and downwardly flanged edges. Said shelves may be of metal and enameled to suit the color scheme of the restaurant. Three supporting rods 20, 21 and 22 are provided for each shelf, said rods extending through holes in the side flanges of the shelf and under the tops of the shelves, and provided on their ends with rollers 23.

The ends of the rods 20 and 22 extend sufficiently for the rollers 23 to engage and ride in the slots in the plates B, the rods extending through the slots but being short enough to clear the chains E, while the center rod 21 is longer so as to engage the chain E, the ends of said rod being used, as a substitute for the chain pins 19ª to connect the adjacent links 19 together, the extremities of said rod being pierced for the cotter pins 24 to hold the links on the rod.

Thus as the chains E move, the shelves travel with the chains.

To prevent the ends of the rods 20 and 21 from entering the upper end of the slot 7 as a pan approaches the front of the frame, I provide a cross-over or switch in the form of a bar 25 pivoted to the section 13 and normally maintained in the horizontal position shown in Fig. 6 by means of the spring 26 which holds the free end of said bar seated in a bracket 27. The tail 28 of said bar is outwardly and then upwardly curved, so as to be cleared by the end of the front rod 20 of a shelf but to be engaged and forced down by the intermediate rod 21 of said shelf, thus throwing up the bar 25 after the rods 20 and 21 of a pan have crossed over the upper end of slot 7, and permitting the rear rod 22 of the pan to enter said slot as the pan begins to descend. The upper end of the slot 6 is likewise provided with a cross-over 29 pivoted to the section 12 and normally held in its horizontal position to block the mouth of the slot 6, by means of a spring 30 which holds its free end resiliently seated in a bracket 31. The tail 32 of said cross-over is bent upwardly, so as to be engaged by the end of rod 20, after it has crossed over the slot 6, thus raising the cross-over and permitting the rod 21 to pass down into the slot 6.

It is thus evident that the shelves, as they, in turn, reach the front of the frame will descend, maintaining their horizontal position, and pass rearwardly along the bottom flights of the chains. At the rear, the pans in turn rise up to the top flight of the chains, maintaining their horizontal positions unaltered.

In rising at the rear the front rods 20 traverse the slots 9; the intermediate rods 21 traverse the slots 8, while the rear rods 22 traverse the slots 5. To prevent the jarring of the shelves as rods 22 move over the upper end of the slots 9 and 8, and as the rods 21 move over the upper end of the slots 9, I provide pivoted and spring seated cross-overs 32ª for the upper ends of slots 8 and 9 which enable all of the rods, except those traversing said slots, to ride over the mouths of the latter without jarring, but which permit the rods traversing said slots to push the cross-overs aside and pass freely into the upper slot 2.

The shelves F are provided with upwardly extensible backs 33 normally repressed as shown in Fig. 8, but raised as the pans reach the front of the frame, as shown in Fig. 1.

Thus I have shown the back 33 formed of a piece of sheet metal, which may be enameled, and its ends being bent around the top and bottom bars of a heavy wire frame 34. The back is mounted to slide vertically in a traverse slot 35 in the rear of the pan, and is normally held depressed by the helical springs 36 wound about the vertical bars of the frame 34 between the bottom bar of said frame and the pan.

37 represents track members secured to the inner faces of the plates B near the front of the frame, said tracks, as shown in Fig. 3 having upwardly inclined approaches or rear ends, and horizontal front portions, so that as the shelf moves forwardly, the lower edge of its back 33 will ride up along the tracks 37, raising the back, as shown in Fig. 1, and holding the same elevated until said back passes off said tracks as the shelf starts to descend, thus permitting the back to automatically resume its depressed position relative to the shelf.

I provide means, preferably coin-actuated for driving the chains E to position the shelves F in turn at the front of the machine.

Thus G represents a pair of driving sprockets engaging the chains E from below and rigidly mounted on the shaft 38 whose ends are horizontally journaled in supporting plates 39 attached to the machine frame.

H is a power shaft horizontally journaled in the lower portion of the machine frame in transversely of the machine and driven at constant speed, by the electric motor I. 40 is a bevelled gear on shaft H meshing with a similar gear 41 fixed on the lower end of a sleeve 42 journaled in a bracket 43 on the machine frame.

44 is a vertically disposed shaft journaled in suitable bearings on the machine frame, having its lower end idly stepped in the sleeve 42 while its upper end is provided with a bevelled gear 45 meshing with a larger bevelled gear 46 on the sprocket shaft 38. 47 is a sleeve slidably mounted on the shaft 44 and caused to rotate in unison therewith by means of a radial pin 48 on said shaft engaging a longitudinal slot 49 in said sleeve. The upper end of sleeve 42 is provided with a clutch member, such as angular teeth 50 adapted to engage a complementary clutch member, such as the teeth 51 on the lower end of the sleeve 47. Thus when said sleeve 47 is raised, as shown in Figs. 9, 11 and 15, the shaft 44 and consequently the chains E are idle, but when said sleeve 47 is lowered relative to said shaft 44, so as to engage the clutch 50—51, the sprockets G are driven, causing the chains E and the shelves F to travel.

52 is a collar freely rotating on the sleeve 47 and held against longtitudinal movement relative thereto by means of upper and lower nuts 53 screwed on threaded portions of said sleeve 47. Said collar is provided with opposed pierced ears 54, to whose ends are pivotally connected the lower ends of links 55 which are pivoted at their upper ends to an integral ear 56 depending from the locking bar 57 rigidly carried by the free ends of a pair of links 58 mounted on a horizontal pivot post 59 extending from the plate 39, 60 being a spacing sleeve on said post between said links.

Said bar 57 is normally held seated in one of the locking notches 61 on the perimeter of the locking disk J, rigidly mounted on shaft 38, by means of a helical spring 62 connecting one of said links 58 with a post 62$^a$ extending from the plate 39 and exerting a lifting tension on the locking bar. When the locking bar is engaged with the locking disk, the clutch 50—51 is disengaged and the shaft 44 is idle. The disk J is provided with one or more locking seats. Thus in the drawings I have shown four of such seats, the same being spaced far enough apart so that the disk will travel between locking positions with the shaft 38 sufficiently to move the chains E a distance equal to the distance between centers of adjacent shelves F. To engage the clutch 50—51, and thus apply power to the sprockets G, the locking bar 57 must be depressed out of locking engagement with the disk J.

Thus, I provide on the shaft 38 inside of the disk J but outside of the plate 39, a releasing disk K mounted on the shaft 38 but adapted to turn idly thereon a distance regulated by the locking notches 61 on the disk J. Thus, said disk J being provided with four notches 61 in the drawings, the hub 63 of the disk K is provided with a circumferential slot 64 engaged by a radial pin 65 on said shaft, the slot being of proper length to allow the disk K a quarter turn on said shaft. The disk K is coupled to the disk J by means of a helical spring 66 wound loosely about the hub 63 of disk K and having its ends attached to studs 67 and 68 on the adjacent faces of disks K and J, respectively. The influence of said spring is exerted when wound up, to rotate said disk K in the same direction as that in which the shaft 38 is rotated when power driven, that is, in the mechanism shown, clockwise. The perimeter of the disk K is composed of a plurality of curved surfaces 69, equal in number to the locking seats 61 on the disk J, and eccentric to the axis of the disk K; said surfaces flaring counterclockwise, or in a direction opposite to that of the disk's rotation. 70 represents radial shoulders interposed between adjacent cam surfaces 69. The maximum diameter of the disk K is equal to that of the disk J.

The disks are assembled on the shaft 38 in such relation that when the shaft 38 is locked stationary by the engagement of the locking bar 57 with one of the notches 61 of the disk J, as shown in Figs. 9, 11 and 15, the disk K occupies the relative position shown in Fig. 10 and in dotted lines in Figs. 9 and 11, with the locking bar 57 engaging against one of the shoulders 70, the pin 65 occupying the front end of the slot 64, and the spring 66 being wound up. The releasing disk K is held in this position by means of one of the blocks 71 attached to its rear face, and in number equal to that of the notches 61 in the disk J. The block corresponding to the notch engaged at the time by the locking bar 57, is engaged by a dog 72 pivoted at its angle on a post 72ª extending from the plate 39 and having its angular tail connected from below by the spring 73 to the end of a post 73ª extending from the plate 39. Thus the spring 73 tends to swing the dog 72 into engagement with the block 71. 74 is a finger pivotally connected at its outer end to the lower end of a rocking lever 75 which is pivoted intermediate of its ends to the plate 39. The finger 74 is also connected to the lever 75 by the helical spring 76 which normally causes said finger to press up against the under side of a bracket 77 on the dog 72 which extends forwardly past the disk K. The finger 74 is provided with an angular shoulder 74ª, which is in engagement with the bracket 77. Thus when the lever 75 is rocked, moving its upper end in the direction of the arrow in Fig. 10, the reverse movement of the finger 74 will pull the dog 72 outwardly from engagement with the block 71, thus releasing the disk, so that its spring 66 will cause the disk to be turned clockwise until the radial pin 65 of the shaft 38 engages the rear end of the slot 64 in the hub of said disk. The result is that the cam surface 69, in moving engagement with the locking bar 57, will force the latter downwardly, unlocking the disk J, and consequently the shaft 38, and throwing in the clutch 50—51, as shown in Fig. 12 thereby applying power to the sprockets G and causing the shelves F to travel. The free end of the finger 74 is extended between the disks J and K, and curved as shown in Fig. 10. 78 represents a plurality of pins on the front face of the disk K, one corresponding to each block 71. When the finger 72 is released from the block 71, as above described, and the disk K begins to rotate on the shaft 38 under the influence of the spring 66, the adjacent pin 78 engages and rides along the finger 74, thus depressing the same by stretching the spring 76, and thus permitting the spring 73 to draw the dog 72 back into the position shown in Fig. 10 ready to be engaged by the next locking block 71 when the latter is brought into position by the turning of the disk K, thus again locking the disk K stationary. The pin 78 then rides off the end of the finger 74, permitting the spring 76 to draw said finger back into the position shown in Fig. 10 with its shoulder 74ª engaging the bracket 77. The disk K has now again assumed the relative position shown in Fig. 10, thus relieving its downward pushing action on the locking lever 57 and thereby permitting said lever to spring up into engagement with the next locking notch 61 of the disk J as the same turns into position. Thus the clutch 50—51 is thrown out, rendering the sprocket shaft 38 idle, and the said shaft is again locked stationary, the shaft 38 having rotated just sufficiently, a quarter turn in the drawings, to advance the shelves F a distance equal to the distance from center to center of adjacent shelves.

The movement of the disk K, relative to the shaft 38, is substantially instantaneous, owing to the expansion of the spring 66, and the movement of the shaft 38 and with it the disk J, after the disk K has been again halted, as above described, by the contact of the locking dog 72 with the next block 71, causes the spring 66 to be again wound up for the next release.

It is thus evident that when the upper end of the lever 75 is drawn forwardly, rotary power is applied to the sprockets G long enough to present a fresh shelf F to the front end of the machine, but when the predetermined movement has been accomplished the power is automatically disengaged and the shelves locked stationary once more.

L represents some convenient character of coin controlled actuating mechanism placed at the front of the machine. Thus the same may advantageously be the coin operated mechanism described and claimed in Letters Patent of the United States, No. 1,347,742, issued to me on July 27, 1920. Said coin controlled mechanism is connected, as by the bell crank lever member 79 and link 80 with the upper end of the rocking lever 75.

It is evident that when the proper coin or coins are introduced into the mechanism L and the plunger 81 is depressed tipping the crank 79 forwardly, the upper end of the lever 75 will be moved forwardly, causing the lower end of the lever 75 to be moved rearwardly, thus actuating the driving mechanism as above described. However, even if the plunger 81 of the coin operated mechanism L is still held depressed, the clutch 50—51 will be automatically thrown out and the disk J locked stationary when the limited movement described is completed, owing to the depression of finger 74 by the pin 78, thus causing the dog 72 to swing into engagement with the next block 71.

The disk and clutch mechanism is preferably provided with a dust proof casing M as shown in Fig. 1.

In the use of my units access can be had by the customer only to the front shelf F, and the raised back 33 of said shelf prevents his reaching back to the second shelf. The rear of the unit extends back under the wall N into the kitchen or loading room wherein the plates containing the articles of food are placed on the shelves as they rise from the lower flight of chains E.

In practice I prefer to assemble a plurality of my units side by side, as indicated in Fig. 2, covering the tops of the spaces between the beams A and the plates B, and between the sides of adjacent units with sheets or plates of enameled metal 82 and covering the entire series of units in front of the kitchen wall N with a horizontal glass wall 83 suitably supported by posts 84 and open at the front where an inclined glass shield 85 may be provided. An ornamental glass or enameled metal shelf 86 supported by legs 87 may be provided in front of the units, and the front of the frame under said shelf may be closed by a glass or marble plate or wall 88.

To enable me to either keep articles of food hot or refrigerated I may introduce longitudinal pipes 89 between the upper and lower flights of the shelves F. Such pipes can be conveniently supported by struts or supports extending between the side plates B and may have supply and escape connections 90 at the rear, as shown in Fig. 1.

Where a plurality or battery of units are installed side by side in fitting up a restaurant but one motor is required, the driven shaft extending transversely of all the units and being the common source of power for the same.

From the foregoing description, illustrative of the principles of my invention, it is evident that the same is particularly and advantageously applicable to automatic or self-service restaurants and like purposes where the patron or customer is expected to serve himself to the food or other article to be purchased, by inserting the proper coin or coins into the coin-actuated control mechanism. My invention is much more economical than the types of mechanism for such purposes now in use. It requires much fewer kitchen help as the shelves of a large number of units can be kept loaded by a single person with but little effort, and none of the units are rendered inoperative during reloading. Also hot dishes may be kept at proper temperature on the moving shelves. Thus such articles of food as soups and coffee may be dispensed. Also refrigerated foods such as ice cream and melons may also be dispensed in a satisfactory manner.

If desired cross-overs or switches similar to those provided for the upper ends of the arcuate stop 6 and 7, may be provided for the lower ends of the slots 8 and 9 to properly direct the rods 20 and 22 as the shelf starts to ascend at the rear end of the plates B.

Although, for the sake of clearness, I have minutely described the embodiment of the principles of my invention, shown in the drawings, I don't wish to limit myself thereby, but claim broadly:—

1. In automatic service apparatus, the combination of a plurality of series of dispensing shelves, each series being comprised of shelves arranged to move in unison and to be presented in turn in the dispensing position, and the several series being arranged in parallelism, a common source of power for causing said series of shelves to travel, clutch mechanisms interposed between the series of shelves and said source of power, a separate clutch mechanism being provided for each series of shelves so that any single selected series of shelves may be caused to travel independently of the remaining series, and an individual coin-controlled device for each of said clutch mechanisms whereby upon the insertion of the proper coin or coins into one of said coin-controlled devices the associated clutch mechanism may be thrown into its operative position and the associated series of shelves caused to travel independently of the remaining series.

2. In automatic service apparatus, the combination of a plurality of series of dispensing shelves, each series being comprised of shelves arranged to move in unison and to be presented in turn in the dispensing position, and the several series being arranged in parallelism, a common source of power for causing said series of shelves to travel, clutch mechanisms interposed between the series of shelves and such source of power, a separate clutch mechanism being provided for each series of shelves so that any single selected series of shelves may be caused to travel independently of the remaining series, an individual coin-controlled device for each one of said clutch mechanisms whereby upon the insertion of the proper coin or coins into any one of said coin-controlled devices the associated clutch mechanism may be thrown into its operative position and the associated series of shelves caused to travel independently of the remaining series, and means whereby when a fresh shelf in the traveling series is presented in the dispensing position the travel of said series of shelves is automatically halted.

3. In automatic service apparatus, the combination of a plurality of series of dispensing shelves, each series being comprised of shelves arranged to move in unison and to be presented in turn in the dispensing position, and the several series being arranged in parallelism, a continuously driven power shaft, clutch mechanisms interposed between the series of shelves and said power shaft, a separate clutch mechanism being provided for each series of shelves so that any single selected series of shelves may be caused to travel independently of the remaining series, and an individual coin-controlled device for each of said clutch mechanisms whereby upon the insertion of the proper coin or coins into any one of said coin-controlled devices the associated clutch mechanism may be thrown into its operative position and the associated series of shelves caused to travel independently of the remaining series.

4. In automatic service apparatus, the combination of a plurality of series of dispensing shelves, each series being comprised of shelves arranged to move in unison and to be presented in turn in the dispensing position, and the several series being arranged in parallelism, a continuously driven power shaft, clutch mechanism interposed between the series of shelves and said power shaft, a separate clutch mechanism being provided for each series of shelves so that any single selected series of shelves may be caused to travel independently of the remaining series, an individual coin-controlled device for each of said clutch mechanisms whereby upon the insertion of the proper coin or coins into any one of the coin-controlled devices the associated clutch mechanism may be thrown into its operative position and the associated series of shelves caused to travel independently of the remaining series, and means whereby when a fresh shelf in the traveling series is presented in the dispensing position the travel of said series of shelves is automatically halted.

5. In service apparatus, the combination of a pair of spaced apart side members slotted to form tracks composed of upper and lower horizontal reaches connected together at their ends to form continuous tracks by arcuate slots, a plurality of horizontally disposed shelves mounted between said side members, each shelf being provided with three rods projecting laterally into the slotted tracks at each side, an opposed pair of rods being positioned at the center of the shelf and the remaining rods being opposed in pairs at the front and rear of said shelf, the two center rods only projecting through the slots, and driving chains on the outer sides of said side members and which are engaged by said center rods to cause the shelves to travel.

6. In service apparatus, the combination of a pair of spaced apart side members slotted to form tracks composed of upper and lower horizontal reaches connected together at each end by three spaced apart arcuate slots, a plurality of horizontally disposed shelves mounted between said side members, each shelf being provided with three rods projecting laterally into said slotted tracks at each side, one opposed pair of rods being positioned at the center of the shelf and the remaining rods being opposed in pairs at the front and rear of said shelf, the two center rods only projecting through said slots, driving chains on the outer sides of said side members, and which are engaged by the center rods of said shelves to cause the shelves to travel, and means for distributing the rods to the proper arcuate slots at the ends of the tracks whereby the shelves are caused to maintain their horizontal position throughout their travel.

7. In service apparatus, the combination of a pair of spaced apart side members slotted to form tracks composed of upper and lower horizontal reaches connected together at each end by three spaced apart arcuate slots, a plurality of horizontally disposed shelves mounted between said side members, each shelf being provided with three rods projecting laterally into said slotted tracks at each side, one opposed pair of rods being positioned at the center of the shelf and the remaining rods being opposed in pairs at the front and rear of said shelf, the two center rods only projecting through said slots, driving chains on the outer sides of said side members and which are engaged by the center rods of said shelves to cause the shelves to travel, and automatic switching devices at the ends of said tracks to distribute said rods to the proper arcuate slots whereby said shelves are caused to maintain their horizontal position throughout their travel.

8. In service apparatus, traveling dispensing mechanism, a shaft adapted to actuate the same, a disk rigidly mounted on said shaft, a locking member adapted to engage said disk to hold said shaft stationary, a releasing disk movably mounted on said shaft, a driven shaft, clutch mechanism interposed between said shafts, and means whereby the movement of said second disk independently of said shaft releases said locking means and renders said clutch mechanism operative.

9. In service apparatus, traveling dispensing mechanism, a shaft adapted to actuate the same, a disk rigidly mounted on said shaft, a locking member adapted to engage said disk to hold the dispensing mechanism stationary, a spring actuated releasing disk movably mounted on said shaft and adapted to release said locking member, a second locking member for holding said releasing disk stationary, a driven shaft, operative connection between said shafts including a clutch, means whereby when said first named locking member is released said clutch is engaged, and means for releasing said second named locking means.

10. In service apparatus, traveling dispensing mechanism, a shaft adapted to actuate the same, a disk rigidly mounted on said shaft, a locking member adapted to engage said disk to hold the dispensing mechanism stationary, a spring actuated releasing disk movably mounted on said shaft and adapted to release said locking member, a second locking member for holding said releasing disk stationary, a driven shaft, operative connection between said shafts including a clutch, means whereby when said first named locking member is released said clutch is engaged, means whereby when said locking disk is moved a predetermined degree said first named locking member re-engages said locking disk and said clutch is disengaged, and mechanism for releasing said second named locking member.

11. In service apparatus, the combination of a series of shelves adapted to travel in unison and to be presented in turn at the dispensing position at the front of said apparatus, backs for said shelves, said backs being normally depressed, and means whereby as a shelf assumes the dispensing position its back is elevated to prevent access to the shelves in the rear.

12. In service apparatus, the combination of a series of shelves adapted to travel in unison and to be presented in turn at the dispensing position at the front of said apparatus, said shelves being inclosed by said apparatus except when in the dispensing position, backs for said shelves, said backs being normally depressed, and means whereby as a shelf assumes the dispensing position its back is elevated to prevent access to the shelves in the rear.

Signed at Pittsburgh, Pa., this 3rd day of December, 1920.

EDWARD H. HELT.